INVENTORS.
Powel Crosley, Jr.
BY Stanley E. Rees.
Wood, Herron & Evans
ATTORNEYS.

United States Patent Office 2,797,681
Patented July 2, 1957

2,797,681

OUTDOOR COOKING GRILL

Powel Crosley, Jr., and Stanley E. Kess,
Cincinnati, Ohio

Application June 9, 1954, Serial No. 435,543

3 Claims. (Cl. 126—25)

This invention relates to outdoor cooking grills, and is particularly concerned with an extremely simple structure intended for use by campers, picnickers, hikers and the like. The preferred embodiment of the invention can be compacted into a very small space and the retail purchasing price can be made so low that if desired the unit can be discarded after several uses. At the same time an effective cooking grill has been provided and one which will operate as efficiently as more complicated structures costing far more.

Accordingly, the basic object of the invention has been to provide a cooking grill of extremely simple construction which can be packed to occupy a minimum of space.

Another object has been to provide a grill of extremely simple construction which can be utilized on a lawn without burning the grass or creating a fire hazard.

Another object has been to provide a grill of extremely simple construction which has the same general cooking arrangement as elaborate and expensive grills.

Figures 1, 2, 3, 4:
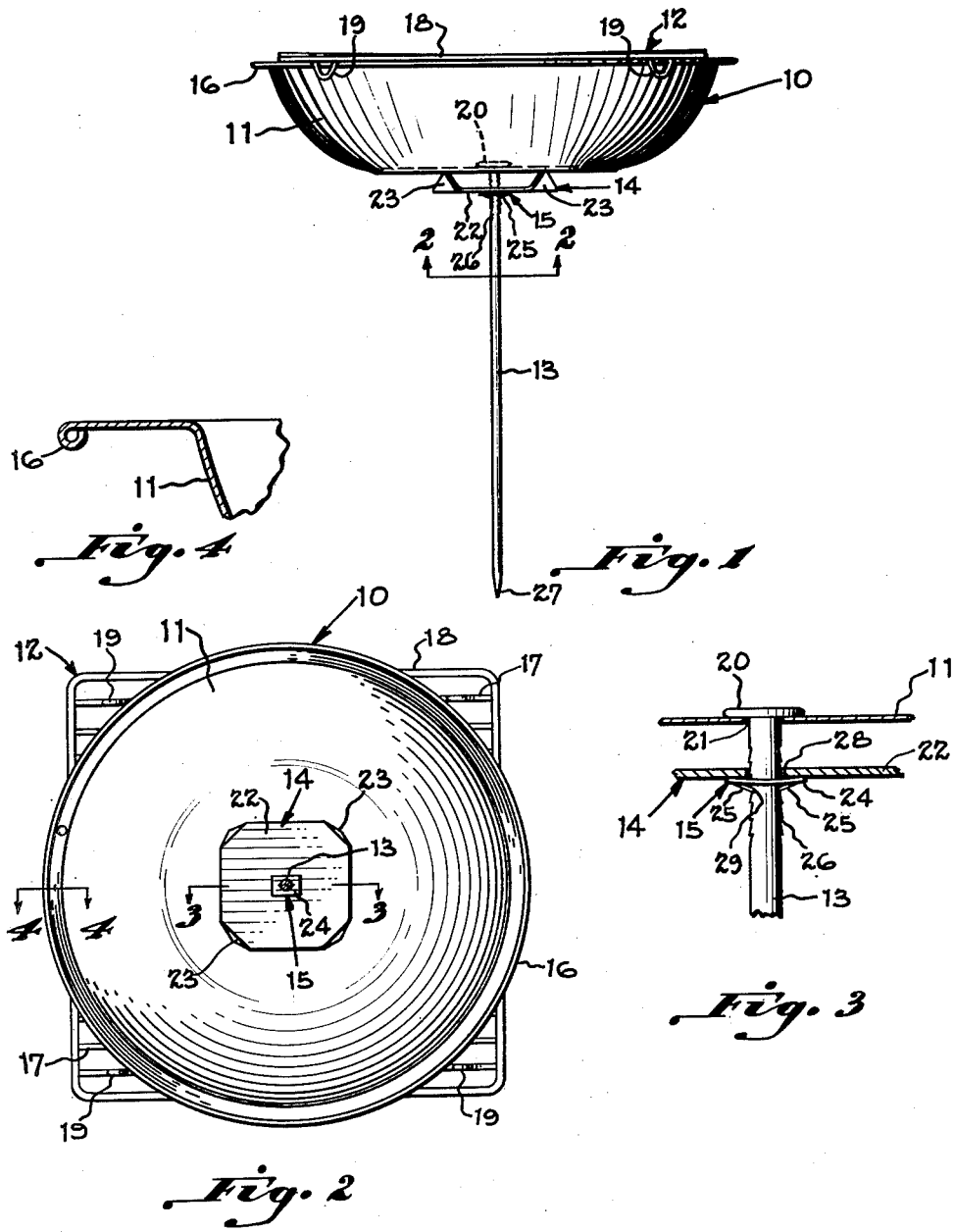
Figure 1 is a perspective view of a preferred embodiment of the grill of the invention fully assembled and in condition for use.
Figure 2 is a bottom plan view looking upward from the line 2—2 Figure 1.
Figure 3 is a sectional view along the line 3—3 Figure 2.
Figure 4 is a sectional view along line 4—4 Figure 2.

As best illustrated in Figure 1 the assembled grill which is designated generally as 10 embodies the component elements of the fire pan 11, the grid 12, a vertical support 13, a spacer 14 and spring clamp 15.

The bowl 11 in which the fire is built is of generally dished shaped configuration preferably formed from sheet metal or the like. A bead 16 is preferably formed on the outer edge of the rim to strengthen and rigidify the structure. The grid element may be rectangular as shown and in area is preferably somewhat larger than the bowl. It is formed from a plurality of grid wires 17 with an outer rim 18 of somewhat heavier gage. Downwardly extending abutments or loops 19 are preferably formed on the inner cross wires at the corners exterior of the bowl and as illustrated in Figure 1 particularly, serve to hold the grid in position on the fire bowl. The vertical support 13 is preferably in the form of a sharpened spike having a head 20 which is inserted through the fire bowl at a central point 21. The spacer 14 may have a generally rectangular base 22 from which the corners 23 are upturned thereby providing point contacts with the fire bowl at a plurality of points radially outwardly of the support. The spacer is threaded on the vertical support through the bore 28. The clamp 15 is preferably formed from tempered steel and has a base 24 from which spring tangs 25 are struck to depend downwardly leaving an aperture 29 for threading on the vertical support. In the assembled unit as illustrated in Figure 3 these tangs 25 engage corrugations 26 formed on the shank of the vertical support to lock the spacer member 14 against the fire bowl and to maintain the latter in rigid position with respect to the vertical support.

One of the features of the invention is the fact that the tempered steel spring clamp 15, is held away from the fire bowl by the spacer, and is thereby sufficiently protected so that it will not lose its temper even with a hot fire in the bowl.

The unit is ordinarily packaged in knockdown condition, and since the vertical support, the spacer, and the clamp may all be placed inside of the bowl, the total space occupied is only that of the shape of the bowl.

In the assembly of the unit the vertical support is first inserted through the aperture 21 in the base of the bowl. The spacer is then threaded on the vertical support. The clamp is next threaded in the same way and is pushed upwardly until the tangs 25 lock with the corrugations 26. For disassembly the clamp can be manually disengaged from the corrugations with no great difficulty.

The unit is preferably inserted directly into the ground and a sharpened end 27 is provided on the vertical support for this purpose. However, if it is desired to use it on a concrete or stone terrace a block of wood will serve as an effective base.

It will be apparent that a simple but effective unit has been provided. The cooking operation is exactly the same as in a conventional grill and since there are no openings in the underside of the fire bowl, ashes and coals cannot escape to mar a lawn or create a fire hazard.

Having fully described our invention, we claim:

1. An outdoor cooking grill comprising a fire bowl, a grid superimposed on said bowl, an aperture at the center of the bottom of said bowl, an elongated pointed spike having a head thereon and having a corrugated shank portion adjacent to said head, said elongated spike extending downwardly through the aperture in said bowl with the head thereon resting on the upper surface of the bottom of said bowl, a plate having an aperture therein, a plurality of corners extending upwardly from said plate, said plate being disposed below the bowl with the spike extending through the aperture therein and with the upturned corners thereon in engagement with the bottom of said bowl whereby the plate is in spaced relation to the bottom of the bowl, and a spring metal clamp engaged on the spike and in contact with the underside of said plate, said clamp including tangs struck therefrom and engaged with the corrugations on the shank of said spike to lock said plate and said spike in place with respect to said bowl.

2. An outdoor cooking grill as set forth in claim 1 in which the bottom of the bowl is flat in the annular area surrounding the aperture therein and in which the corners which extend upwardly from the plate are configurated to make point contact with the bowl in the flat annular area and which points are arranged symmetrically around the spike.

3. An outdoor cooking grill as set forth in claim 1 in which the plate is rectangular and in which the four corner portions thereof are turned upwardly at right angles to the plane of the plate to provide triangularly shaped corners having pointed upper ends.

References Cited in the file of this patent

UNITED STATES PATENTS

| | | |
|---|---|---|
| D. 91,639 | Stulik | Feb. 27, 1934 |
| 1,613,654 | Griffith | Jan. 11, 1927 |
| 1,874,185 | Goldstein | Aug. 30, 1932 |
| 2,113,082 | Halter | Apr. 5, 1938 |
| 2,573,988 | Salzberg | Nov. 6, 1951 |